United States Patent [19]

Stein et al.

[11] 4,094,033
[45] June 13, 1978

[54] CLEANING DEVICE

[75] Inventors: Klaus Stein, Velbert; Miroslav Aigl, Ennepal; Gerhard Richter, Wuppertal, all of Germany

[73] Assignee: Vorwerk & Co. Interholding GmbH, Wuppertal, Germany

[21] Appl. No.: 682,173

[22] Filed: Apr. 30, 1976

[30] Foreign Application Priority Data

Apr. 30, 1975  Germany .............................. 2519155

[51] Int. Cl.² .............................................. A47L 11/33
[52] U.S. Cl. .................................... 15/41 R; 15/49 R; 310/58
[58] Field of Search .................... 15/49 R, 49 C, 50 R, 15/50 C, 98, 412, 413; 310/52, 58, 59, 62, 63; 51/176, 177

[56]  References Cited

U.S. PATENT DOCUMENTS

| 1,175,977 | 3/1916 | Nolan | 310/63 |
| 1,739,653 | 12/1929 | Sassano | 15/49 C |

*Primary Examiner*—Edward L. Roberts
*Attorney, Agent, or Firm*—Michael J. Striker

[57]  ABSTRACT

A cleaning device includes a housing which bounds an internal space, and an electric motor and bearings for the shaft of the rotor of the electric motor are accommodated in such space. A blower element shares in the rotation of the shaft and advances air from the exterior of the housing through the space and back to the exterior. A partitioning wall subdivides the space into separate compartments one of which accommodates the electric motor, the other compartment accommodating one of the bearings. The blower element advances the air through both of such compartments to cool the electromotor, on the one hand, and the bearing, on the other hand, independently of one another. The partitioning wall may be provided with an opening which admits a branched-off portion of the air from one compartment toward a commutator accommodated in the other compartment downstream of the electric motor. The bearings are supported in bearing blocks formed as parts of the housing, the bearing blocks having semi-annular bearing recesses and tangentially extending straight extensions thereof. A resiliently yieldable clamp extends between the extensions and urges the respective bearing into the bearing recess. Sheet-metal portions of holding devices for commutator brushes shield the housing from sparks which are generated by the contact of the commutator brushes with the commutator.

15 Claims, 6 Drawing Figures

CLEANING DEVICE

BACKGROUND OF THE INVENTION

The present invention relates to a cleaning device, particularly to a carpet sweeping device.

There are already known various devices of the type here under consideration. It is also already known to make the housing of such a device of synthetic plastic material, and particularly by assembling the housing from several parts. The carpet-sweeping devices are usually equipped with at least one cylindrical brush which is driven into rotation by an electric motor, the various movable or immovable components of the device being mounted on the housing or in recesses thereof. It is also already known to support the shaft of the rotor of the electric motor in plain or journal bearings which may be similarly accommodated in recesses provided in or on the housing.

The modern trend in designing and constructing such devices is to so configurate the housing that the various components of the device can be easily but reliably connected to the housing portions or shells during the assembly of the housing of the cleaning device so that an operative device is obtained after assembly of the housing shells.

In some types of such prior-art cleaning devices, the rotor of the electromotor is mounted in the synthetic plastic material housing of the cleaning device by means of conventional calotte journals which are mounted at the projecting end portions of the shaft of the rotor. It is further known to introduce such calotte journals into bearing recesses which are configurated as half-shells, such half-shells being constituted by portions of the housing, and to secure the bearings in such recesses by means of shells which abut against the projecting parts of the calotte bearings.

When the journals are so separately received in the housing, it is already known to cool such bearings or journals by means of cooling air which is blown or drawn through the electromotor, also cooling the same.

This solution to the cooling problem is possessed of several serious drawbacks. First of all, the journals which are supported in the synthetic plastic material housing in the above-mentioned half-shells, and which are acted upon a force acting in a predetermined direction resulting from the action of a driving belt on the shaft of the rotor, cannot be efficiently cooled by heat conduction. Thus, the respective journal bearing transmits a substantial part of the heat generated therein during the operation of the device to the synthetic plastic material of the housing. Under certain circumstances, especially after an extended period of use of the device, the synthetic plastic material of the housing may melt or become flowable so that the journal bearings may eventually move out of the bearing half-shell. It is further disadvantageous that the so-constructed journal bearings are not provided with a protective shielding which would cover the journal bearing from all sides so that, when the device is used for an extended period of time, the lubricant may flow out of the bearing and onto the surrounding portions of the housing or other components of the device. This is disadvantageous not only because of the fact that such lubricant soils the environment of the bearing, but primarily for the reason that the bearing is deprived of such escaped lubricant and it is very hard, if not impossible, to replenish the lubricant in the journal bearing.

A further disadvantage of the prior-art devices is that the housing of the device is provided with inlet and outlet openings for the cooling air which are usually not aligned with one another in the axial direction of the electric motor. As a result of this arrangement, the flow of the air through the interior of the housing must be diverted downstream of the electric motor to escape through the outlet opening, which may result in recirculation of a part of the already heated cooling air and, in either event, the cooling air which has already been heated by the passage thereof through the electric motor arrives at and dwells in the vicinity of the bearing which is located to the other axial side of the electric motor from the blower element which advances the air through the interior of the housing, so that the cooling effect of such already heated air on the above-mentioned bearing is, in most instances, completely insufficient.

A further drawback of the prior-art cleaning devices of the type here under consideration, that is such devices at least a housing of which can be damaged or destroyed by excessive heat, is that the sparks which are generated at the interface of a commutator and a respective commutator brush must be prevented from coming into contact with the material of the housing, for which purpose the prior art has proposed various rather complex and expensive measures.

SUMMARY OF THE INVENTION

Accordingly, it is a general object of the present invention to avoid the disadvantages of the prior art.

More particularly, it is an object of the present invention to provide a cleaning device of the type here under consideration which is not possessed of the disadvantages of similar prior-art devices.

It is a further object of the present invention to provide a cleaning device which is simple in construction and reliable in operation.

A concomitant object of the present invention is to provide a cleaning device which has an excellent flow pattern of the cooling air through the interior of its housing to the various components of the device which are to be cooled.

Yet another object of the present invention is to provide a housing for a cleaning device which renders it possible to use encapsulated journal bearings with a selectable displacement moment.

It is a still another object of the present invention to provide a cleaning device in which the housing of the device is protected from detrimental influences of sparks generated by the contact of the commutator brushes with the commutator of the electromotor.

In pursuance of these objects and others which will become apparent hereafter, one feature of the present invention resides, briefly stated, in a cleaning device, particularly in a carpet-sweeping device, in a combination which comprises a housing bounding an internal space; cleaning means mounted on the housing; means for driving the cleaning means including an electric motor accommodated in the internal space, and means for mounting the electric motor on the housing; partitioning means connected to the housing and subdividing the internal space into at least two separate compartments each of which accommodates at least one component of the device which generates heat during the operation of the device; and means for advancing a cooling medium through each of the compartments to thereby remove heat from the components.

In a currently preferred embodiment of the present invention, the advancing means includes a blower element which is mounted on the shaft of the rotor of the electric motor at one axial side of the electric motor for shared rotation with the shaft, and the partitioning means includes at least one partitioning wall situated downstream of the blower element. In this embodiment, the electric motor is accommodated in one of the compartments and constitutes one of the heat-generating components, and the mounting means includes at least one bearing which is located at the other axial side of the electric motor from the blower element and constituting another heat-generating component which is accommodated in the other of the compartments. The mounting means may further include an additional bearing in the space at the one side of the electric motor upstream of the blower element.

According to a further concept of the present invention, the electric motor further includes a commutator which is mounted on the shaft to the other axial side of the electric motor for shared rotation with the shaft, the collector being accommodated in one of the compartments and constituting one of the heat-generating components. Preferably, the electric motor and the commutator are accommodated in the same compartment, and the partitioning wall includes at least one opening downstream of the electric motor and operative for branching-off a portion of the cooling medium which advances through the other compartment and for directing such portion against the commutator to cool the same. In a further advantageous embodiment of the present invention the mounting means includes bearings which are mounted on the housing and support the shaft of the rotor of the electric motor, the housing including bearing blocks which support the bearings. Each of the bearing blocks may include a semi-annular recess in which the respective bearing is received, and a pair of straight arms which extend tangentially from the recess and form an extension thereof beyond the axis of the bearing. Advantageously, the bearings are encapsulated radial journals which have a predetermined displacment moment.

In a currently preferred embodiment of the invention, the semi-annular recess in the respective bearing block is bounded by semi-annular projections which are arranged to the two axial sides of the recess. A clamping element may be mounted on the bearing block and connect the respective bearing to the respective bearing block. Such clamping element may be at least partially resiliently yieldable so as to urge the bearings against the bearing block and into the semi-annular recess.

A further feature of the present invention resides in the fact that the housing is protected from detrimental influences of sparks which are generated during the contact of the commutator brushes with the commutator while the device is in operation by protective shielding elements of metal-sheet material which are located in the path of the sparks underneath the commutator in the operating position of the device. Preferably, such shielding elements are constituted by deflected portions of holding elements of the commutator brushes.

The advantages obtained by this particular construction of the cleaning device of the present invention are manifold.

First of all, the provision of the partitioning wall downstream of the blower element and separating the space of the housing into separate compartments results in a situation where the bearing which is located to the other axial side of the electric motor from the blower element is not cooled by the cooling air which has already passed through the electric motor and became heated thereby, but rather by a different, still cool, airstream which is branched off upstream of the electric motor and passes through the compartment in which the bearing is situated. A further advantage of this construction is to be seen in the fact that the opening in the partitioning wall permits a part of the airstream in the compartment accommodating the bearing to be admitted toward the collector so as to cool the same. It is further advantageous that the bearing recesses are so constructed that they are capable of supporting encapsulating journals therein, and that such bearings can be secured in such bearing recesses without special attention to machine tolerances and without special assembling measures by means of the resilient clamp. An advantage of the encapsulated journals with a predetermined displacement moment is that they give the entire device an extended lifetime as compared to conventional journals which, if they were used, would be displaced, within a short period of time, out of the bearing recess in the housing by the force which results from the action of the driving belt on the shaft of the rotor and which acts in a predetermined direction, and which would also lose their entire oil supply within such a period of time. A further advantage of this particular construction of the cleaning device is that the holding devices of the commutator brushes which are equipped with the shielding elements effectively protect the housing from the detrimental influence of the sparks which are generated during the operation of the cleaning device at the contact surfaces of the collector brushes with the collector, which sparks would otherwise damage or destroy the housing or at least some parts thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DISCUSSION OF THE PREFERRED EMBODIMENTS

Figure 1:
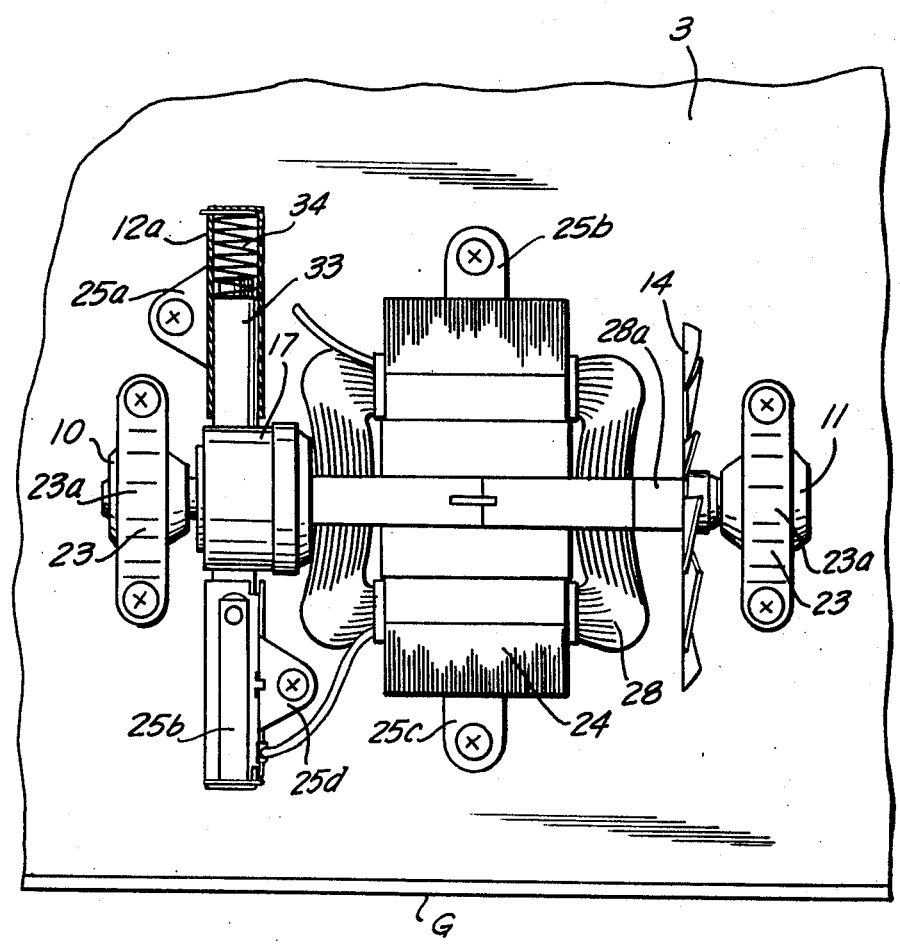
FIG. 1 is a top plan view of a portion of a housing of the cleaning device of the present invention, with an electromotor and components associated therewith mounted on the housing.

Referring now to the drawings in detail, and first to FIG. 1, it may be seen that the housing of the cleaning device has been designated in toto with a reference character G. The housing bounds an internal space 3, and an electric motor of conventional construction is accommodated in the internal space 3. The electric motor includes a stator 24, and a rotor 28 which includes a shaft 28a. A blower element 14 is mounted on the shaft 28a for shared rotation therewith. A pair of encapsulated bearings 10 and 11, which will be described in more detail later on, is mounted at axially spaced end portions of the shaft 28a and the bearings 10 and 11 are supported on bearing blocks 5 which are illustrated in more detail in FIGS. 4 and 5. The bearings or journals 10 and 11 are secured to the bearing blocks 5 by means of clamps 23.

The stator 24 is provided with lugs 25b and 25c by means of which the stator 24 is connected to the housing G.

Intermediate the bearing 10 and the rotor 28, a commutator 17 is mounted on the shaft 28a for shared rotation therewith. Commutator brush holding devices 12a and 12b are arranged radially adjacent to the commutator 17, and include commutator brushes 33, and springs 34 which urge the commutator brushes 33 into contact with the commutator 17. The commutator brush holding devices 12a and 12b are provided with lugs 25a and 25d by means of which the holding devives 12a and 12b are connected to the housing G. The electric motor and the components associated therewith are assembled with the housing G in a manner which will be now discussed. First of all, the rotor 28 is introduced into the interior of the stator 24, for instance, by sliding the stator 24 over the rotor 28. The shaft 28a of the rotor 28 is equipped, at one of its end portions, with the blower element 14 and, at the other end portion, with the commutator 17. Subsequent to the introduction of the rotor 28 into the interior of the stator 24, the encapsulated journals 10 and 11 are mounted on the projecting end portions of the shaft 28a. Upon this partial assembly of the electric motor, the electric motor is placed into the internal space 3 of the housing G. Simultaneously therewith, the encapsulated journals 10 and 11 are received in semi-annular recesses of the bearing blocks 5, as discussed in more detail in connection with FIG. 4. Then, the encapsulated journals 10 and 11 are secured to the respective bearing blocks 5 by means of the clamps 23, at least a middle portion 23a of each clamp 23 being resiliently yieldable. Conventional screws or similar connecting elements can be used for connecting the lugs 25b, 25c, 25a and 25d, as well as the clamps 23 to the housing G or the bearing blocks 5 thereof. Having so connected the collector brush holding devices 12a and 12b and the stator 24 and the rotor 28 to the housing G, the electromotor is ready to operate after establishing the necessary electrical connections in a conventional manner.

Figure 2:
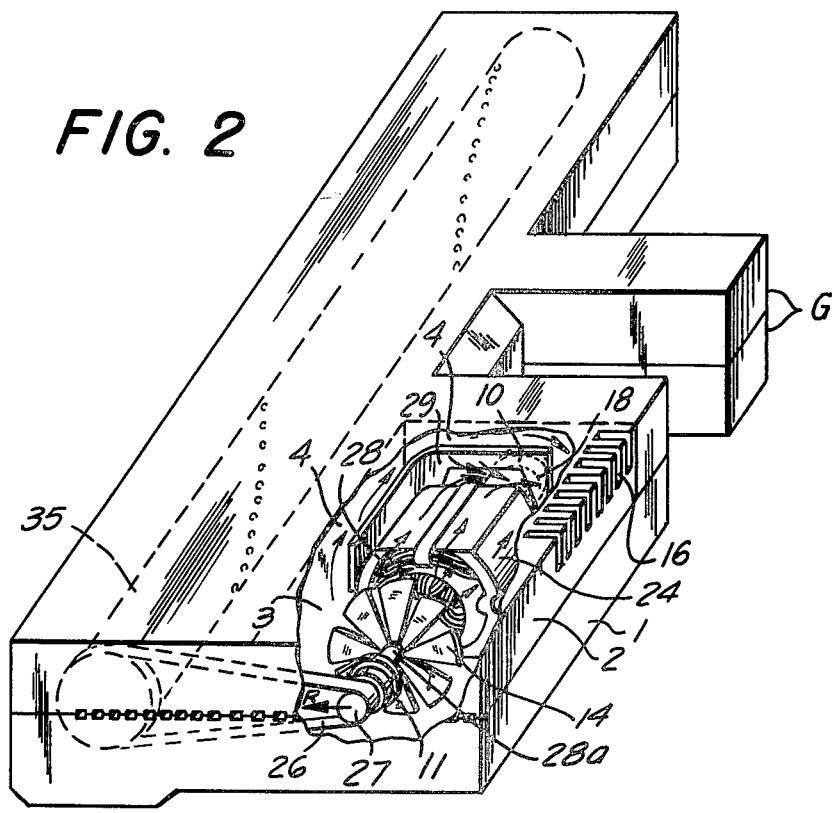
FIG. 2 is a partially diagrammatic perspective view of the cleaning device of the present invention with parts of the housing being broken away so as to visualize the arrangement of the electric motor within the interior of the housing.

The diagrammatic perspective view of the cleaning device of the present invention illustrated in FIG. 2 affords a view into the internal space 3 of the housing G. It may be seen that the housing G is assembled from two housing shells 1 and 2 which are connected to one another in any convenient manner. FIG. 2 also illustrates that a separate compartment 4 is formed in the internal space 3 by a partition 29 so that the air which is advanced through the internal space 3 by the blower element 14 flows not only through the electromotor but also through the compartment 4 and past the bearing 10. The partitioning wall 29 may be formed as a part of the shell 2 so that the separate compartment 4 is formed in the internal space 3 upon assembly of the shells 1 and 2. The mainstream of the air advanced through the internal space 3 by the blower element 14 passes through the electromotor, particularly between the stator 24 and the rotor 28 thereof, but partially also outwardly around the stator 24, thus cooling both the rotor 28 and the stator 24, on its way to the exit opening or openings 16 provided in the shell 2. A branched-off stream of the cooling air passes through the compartment 4 defined in the space 3 by the partition 29, and around the bearing or journal 10, on its way out of the internal space 3 through the opening or openings 16. A portion of the airstream passing through the compartment 4 may be led through an opening 18 in the partitioning wall 29 located downstream of the electric motor, to flow around the commutator 17 and to cool the same. The various partial streams of the cooling air merge with one another at the downstream end of the partitioning wall 29, the combined stream exiting from the internal space 3 through the outlet opening or openings 16. The shell 1 of the housing G accommodates the stator 24 of the electric motor, the journals 10 and 11, and the other various components of the drive, such components being connected to such shell 1 of the housing G. A cylindrical brush 35 is also mounted on the housing G, that is, on the shells 1 and 2 thereof, for rotation about an axis. A pulley 27 is connected to that end portion of the rotor shaft 28a which is arranged at the same side of the electromotor as the blower element 14, and a belt 26 is trained about the pulley 27 and about a portion of the cylindrical brush 35, transmitting the rotation of the former to the latter. The belt 26 acts on the shaft 28a with a force R acting in a predetermined direction. The bearings 10 and 11 must be so constructed as to be capable to withstand this force R.

Figure 3:
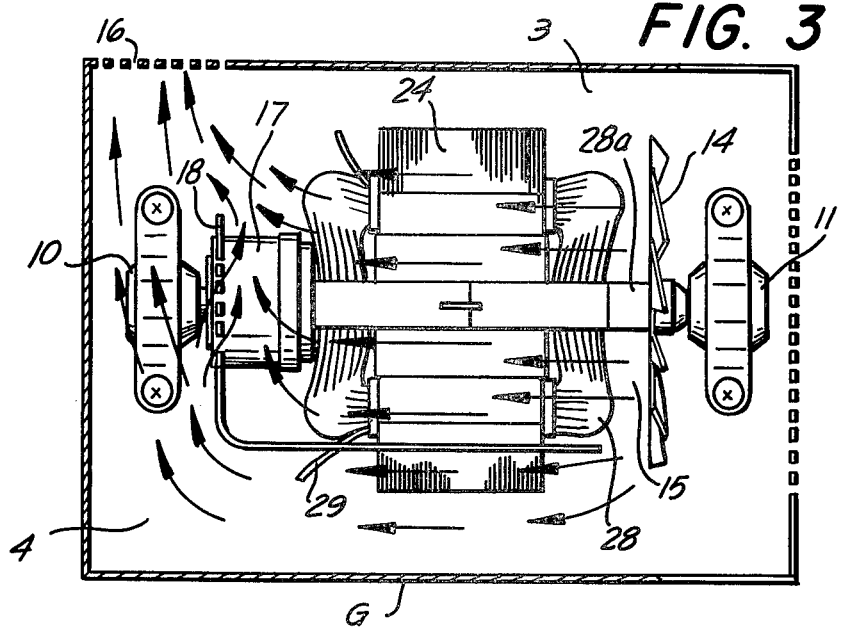
FIG. 3 is a view similar to FIG. 1 but illustrating the partitioning wall and the flow pattern of the cooling air through the interior of the housing.

FIG. 3 illustrates the flow pattern of the cooling air through the internal space 3 of the housing G. As already explained above, the partitioning wall 29 subdivides the internal space 3 in two separate flow paths. On the one hand, the blower element 14 advances the stream of cooling air through and/or around the electric motor, thus cooling the same; the cooling air is drawn into the internal space 3 from the exterior of the housing G past the bearing 11, thus cooling the same. On the other hand, a partial cooling airstream is forced into the compartment 4 bounded by the partitioning wall 29, and advances through such a compartment 4. The airstream which flows around the stator 24 and the rotor 28 further advances to the collector 17, but is prevented from proceeding any further by the partitioning wall 29, being diverted by the latter toward the outlet opening or openings 16. The partial airstream which is forced into the compartment 4 advances past the journal 10 on its way to the air exit openings 15. A small portion of this partial airstream is branched off and passes through the opening 18 in the partitioning wall 29 past the collector 17, thus achieving additional cooling thereof.

Figure 4:
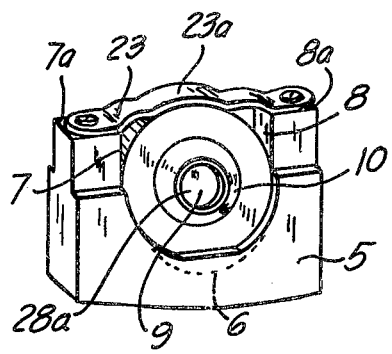
FIG. 4 illustrates a bearing block and a journal mounted in the bearing block.
Figure 5:
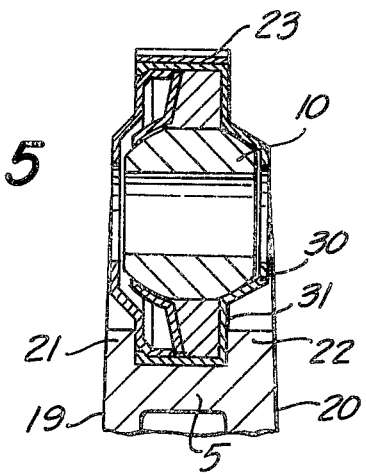
FIG. 5 is an axial sectional view through the journal and bearing block of FIG. 4.

FIG. 4 illustrates, in a perspective view, a section of the housing, particularly the bearing block 5 thereof. As illustrated, a bearing 10 is accommodated in and supported by the bearing block 5. However, it is to be understood that the journal or bearing 11 may be supported on the housing G in a similar manner. The bearing block 5 has a special configuration which is suited for reliably supporting the journal 10 thereon. The encapsulated journal 10 rests in a semi-annular recess 6 formed in the bearing block 5, a pair of arms 7 and 8 extending upwardly from the recess 6 and consitituting a continuation thereof. The arms 7 and 8 extend tangentially of the recess 6 along straight lines beyond a center 9 of the bearing 10 and thus prevent the journal or bearing 10 from moving laterally out of the bearing recess 6. The arms 7 and 8 have upper end portions 7a and 8a to which the previously discussed clamp 23 is connected in a conventional manner, such as by screws. At least the central portion 23a of the clamp 23 is elastically yieldable and urges the bearing 10 into the semi-annular bearing recess 6.

The bearing block 5 with its arms 7 and 8, together with the clamp 23, prevent the bearing 10 from movement in the radial direction thereof. However, since it is also desirable to avoid axial movement of the bearing 10 relative to the bearing block 5, the bearing block 5 is formed with semi-annular projections 21 and 22 which are most clearly seen in FIG. 5. The projections 21 and 22 surround the lower part of the journal 10 from both axial sides thereof and thus prevent the axial displacement of the bearing 10 relative to the bearing block 5. As illustrated, the journal 10 is encapsulated in a capsule 30 which has a flange 31 which is received between the projections 21 and 22 of the bearing block 5. In this manner, the journal 10 is prevented not only from axial displacement, but also from tilting.

Figure 6:
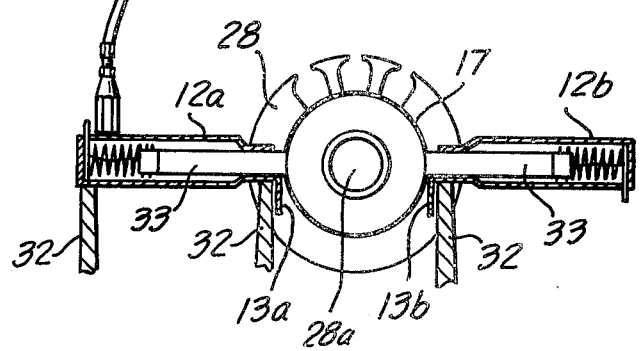
FIG. 6 is a diagrammatic cross-sectional view through the collector and collector brushes of the electromotor of the present invention.

Referring now to FIG. 6 which represents a transverse section through the commutator 17 and through the commutator brushes and the holding devices 12a and 12b therefor, it may be seen that the holding devices 12a and 12b are supported on supporting portions 32 of the housing G. The holding devices 12a and 12b are formed with deflected portions 13a and 13b which are located adjacent to the respective support portions 32, the deflected portions 13a and 13b being located in the path of the sparks which are generated during the contact of the commutator brushes 33 with the commutator 17. The portions 13a and 13b of the holding devices 12a and 12b shield the portions 32 of the housing G from such sparks which would otherwise damage or destroy the supporting portions 32. However, such shields could also be constituted by separate elements connected either to the holding devices 12a and 12b or to the support portions 32. The shields 13a and 13b are located underneath the holding devices 12a and 12b in the operating position of the device.

It will be understood that each of the elements described above, or two or more together, may also find a useful application in other types of constructions differing from the types decribed above.

While the invention has been illustrated and described as embodied in a cleaning device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a cleaning device, particularly in a carpet-sweeping device, a combination comprising a housing bounding an internal space; cleansing means mounted on said housing; means for driving said cleaning means, including an electric motor accommodated in said space and having a stator and a rotor having an elongated shaft which has end portions, and means for so mounting said electric motor on said housing that said end portions of said shaft project from said stator, including at least two bearings each interposed between said housing and one of said end portions of said shaft at a distance from said stator; means for advancing a stream of a cooling medium through said space in a direction from one of said bearings toward said electric motor and toward the other of said bearings; and partitioning means located within said housing and including an L-shaped partition which has two arms one of which commences upstream of said electric motor as considered in said direction and extends alongside said electric motor, the other of said arms extending from said one arm transversely of and beyond said shaft between said electric motor and said other bearing, said partition subdividing said space into a first channel for a main stream of the cooling medium and accommodating said electric motor and a second channel for a branch stream of the cooling medium and accommodating said other bearing, for the branch stream to bypass said electric motor and thus remain effective for cooling said other bearing and to join the main stream only after cooling said other bearing and downstream of said electric motor for joint discharge from said space.

2. A combination as defined in claim 1, wherein said advancing means includes a blower element mounted on said shaft at one axial side of said electric motor for shared rotation; and wherein said partitioning means is situated downstream of said blower element.

3. A combination as defined in claim 2, wherein said housing has at least one inlet opening upstream of said blower element, and at least one outlet opening downstream of said partition and communicating said space with the exterior of said housing; and wherein said cooling medium is ambient air drawn into the space through said inlet opening and expelled therefrom through said outlet opening.

4. A combination as defined in claim 2, wherein said electric motor further includes a commutator mounted on said shaft to the other axial side of said electric motor for shared rotation; and wherein said commutator is accommodated in one of said channels.

5. A combination as defined in claim 4, wherein said electric motor further includes commutator brushes mounted on said housing and contacting said commutator, and means for shielding said housing from sparks which develop between said commutator brushes and said commutator, including protective shielding elements.

6. A combination as defined in claim 5, wherein said shielding elements include metal-sheet members located in the path of said sparks.

7. A combination as defined in claim 6, wherein said metal-sheet members are located underneath the commutator in the operating position of the device.

8. A combination as defined in claim 7, wherein said commutator brushes include holding elements; and wherein said metal-sheet members are constituted by deflected portions of said holding elements.

9. A combination as defined in claim 4, wherein said electric motor and said commutator are accommodated in the same channel; and wherein said partition includes at least one opening downstream of said electric motor and operative for branching-off a portion of the branch stream and directing such portion against said commutator to cool the same.

10. A combination as defined in claim 1, wherein said housing includes bearing blocks which support said bearings.

11. A combination as defined in claim 10, wherein each of said bearing blocks includes a semi-annular recess in which the respective bearing is received, and a pair of straight arms which extend tangentially from said recess and form an extension thereof beyond the axis of said bearing.

12. A combination as defined in claim 11, wherein said bearings are encapsulated radial journals which have a predetermined displacement moment.

13. A combination as defined in claim 10, wherein each of said bearing blocks includes a semi-annular recess in which the respective bearing is received, said recess being bounded by semi-annular projections arranged to the two axial side thereof.

14. A combination as defined in claim 10, and further comprising clamping elements mounted on said bearing blocks and connecting said bearings to the same.

15. A combination as defined in claim 14, where said clamping elements are at least partially resiliently yieldable and urge said bearings against said bearing blocks.

* * * * *